United States Patent [19]

Schmoock

[11] Patent Number: 4,631,969

[45] Date of Patent: Dec. 30, 1986

[54] CAPACITANCE-TYPE ELECTRODE ASSEMBLIES FOR ELECTROMAGNETIC FLOWMETER

[75] Inventor: Roy F. Schmoock, Yardley, Pa.

[73] Assignee: Fischer & Porter Company, Warminster, Pa.

[21] Appl. No.: 762,527

[22] Filed: Aug. 5, 1985

Related U.S. Application Data

[60] Continuation-in-part of Ser. No. 655,519, Sep. 28, 1984, Pat. No. 4,567,777, which is a continuation-in-part of Ser. No. 536,275, Sep. 27, 1983, Pat. No. 4,497,212, which is a division of Ser. No. 398,809, Jul. 16, 1982, Pat. No. 4,420,982, which is a division of Ser. No. 174,609, Aug. 1, 1980, Pat. No. 4,358,963, which is a continuation-in-part of Ser. No. 75,037, Sep. 12, 1979, Pat. No. 4,253,340, which is a continuation-in-part of Ser. No. 811,276, Jun. 29, 1977, Pat. No. 4,181,018, which is a division of Ser. No. 771,420, Feb. 23, 1977, Pat. No. 4,098,118.

[51] Int. Cl.[4] .............................................. G01F 1/58
[52] U.S. Cl. .................................................. 73/861.12
[58] Field of Search ............ 73/861.12, 861.14, 861.15

[56] References Cited

U.S. PATENT DOCUMENTS

| | | | |
|---|---|---|---|
| 3,824,856 | 7/1974 | Yard | 73/861.12 |
| 3,839,912 | 10/1974 | Schmoock et al. | 73/861.12 |
| 3,981,190 | 9/1976 | Vidmantas | 73/861.12 |
| 4,019,386 | 4/1977 | Appel et al. | 73/861.14 |
| 4,098,118 | 7/1978 | Schmoock | 73/861.12 |
| 4,420,982 | 12/1983 | Schmoock | 73/861.12 |
| 4,434,666 | 3/1984 | Hemp | 73/861.12 |
| 4,513,624 | 4/1985 | McHale et al. | 73/861.12 |

*Primary Examiner*—Herbert Goldstein
*Attorney, Agent, or Firm*—Michael Ebert

[57] ABSTRACT

An electromagnetic flowmeter for metering the flow rates of fluids of low conductivity, the flowmeter including a non-magnetic spool within which is disposed a pair of electrode assemblies at diametrically-opposed positions embedded with an insulating layer molded against the inner surface of the spool. Each assembly is constituted by a curved measuring electrode plate and a curved shielding electrode plate concentric with the spool, the face of the measuring electrode plate being exposed. Received within the insulating layer and covering the faces of the measuring electrode plates is a tubular liner made of dielectric material whose properties are appropriate to the fluid being metered, the liner defining a flow conduit for the fluid. In operation, each measuring electrode forms one plate of a capacitor whose dielectric is the liner and whose other plate is the fluid being metered, the electrodes acting as a capacitance-sensor to detect the voltage induced in the fluid when it intercepts a magnetic field whose lines of flux are normal to the flow direction.

8 Claims, 7 Drawing Figures

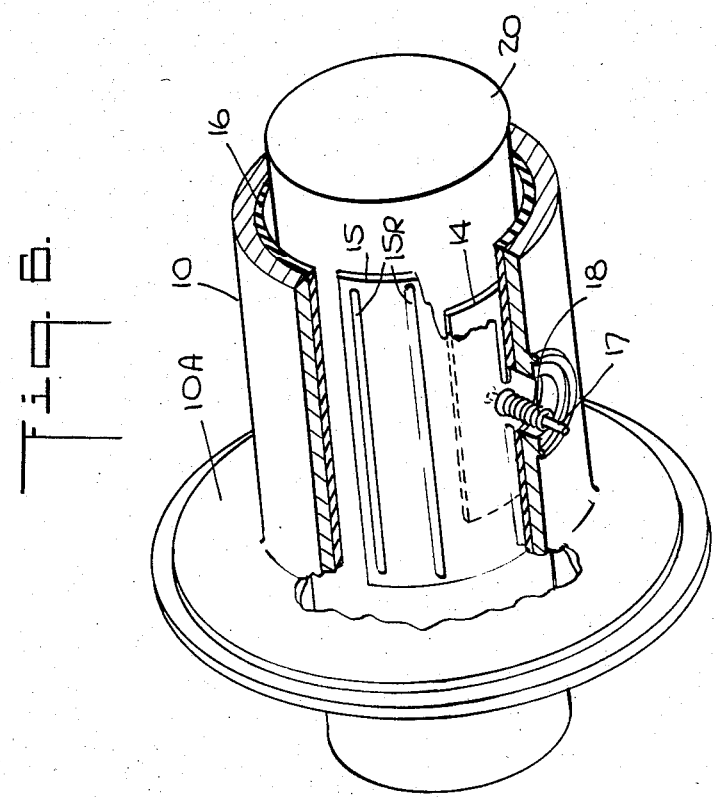
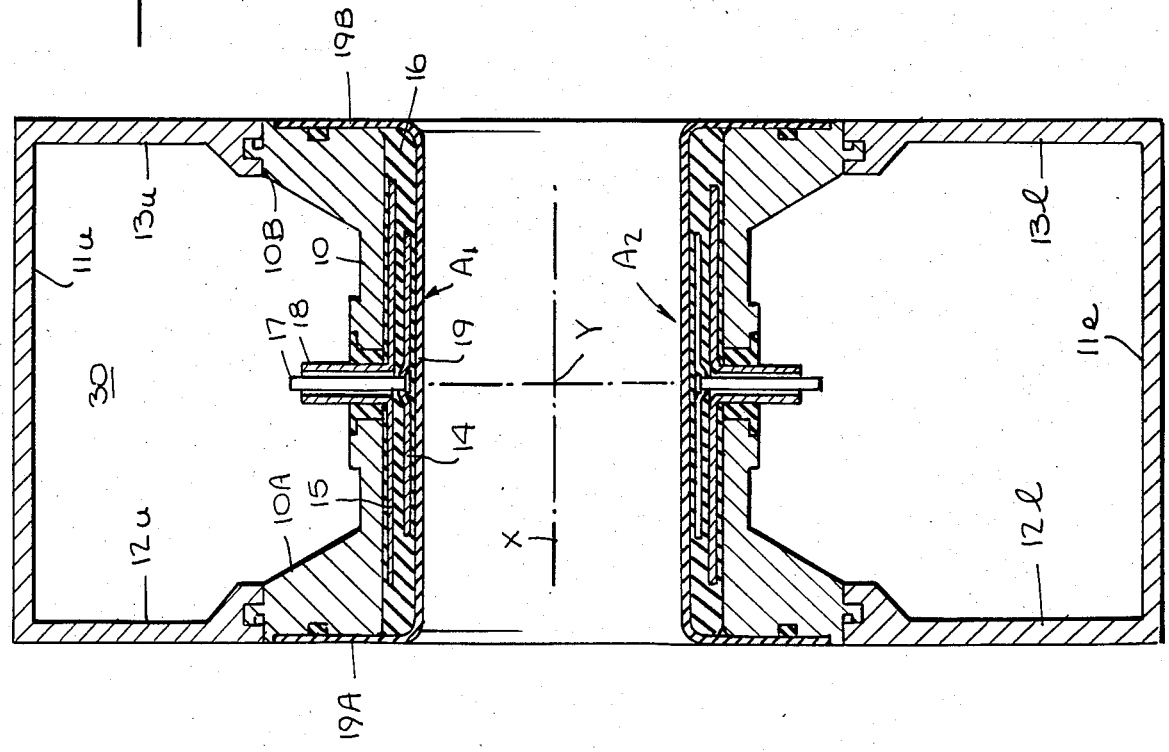

CAPACITANCE-TYPE ELECTRODE ASSEMBLIES FOR ELECTROMAGNETIC FLOWMETER

RELATED CASES

This application is a continuation-in-part of my copending application Ser. No. 655,519 filed Sept. 28, 1984 (now U.S. Pat. No. 4,567,777), which is a continuation-in-part of an earlier-filed application Ser. No. 536,275, filed Sept. 27, 1983 (now U.S. Pat. No. 4,497,212), which is a division of an application Ser. No. 398,809, filed July 16, 1982 (now U.S. Pat. No. 4,420,982), which in turn is a division of an application Ser. No. 174,609, filed Aug. 1, 1980 (now U.S. Pat. No. 4,358,963), which is a continuation-in-part of an application Ser. No. 75,037, filed Sept. 12, 1979 (now U.S. Pat. No. 4,253,340), which is a continuation-in-part of an application Ser. No. 811,276, filed June 29, 1977 (now U.S. Pat. No. 4,181,018), that is a division of an original application Ser. No. 771,420 filed Feb. 23, 1977 (now U.S. Pat. No. 4,098,118). The entire disclosures of these related cases are incorporated herein by reference.

BACKGROUND OF INVENTION

1. Field of Invention

This invention relates generally to electromagnetic flowmeters, and in particular to a flowmeter which includes a lined, non-magnetic spool serving as the conduit for the fluid being metered, and a pair of electrode assemblies encapsulated within an insulating layer molded against the inner surface of the spool to provide a capacitance sensor for measuring fluids.

2. Prior Art

Magnetic flowmeters such as those disclosed in U.S. Pat. Nos. 3,695,104; 3,824,856; 3,783,687 and 3,965,738, are especially adapted to measure the volumetric flow rates of fluids which present difficult handling problems, such as corrosive acids, sewage and slurries. Because the instrument is free of flow obstructions, it does not tend to plug or foul.

In a magnetic flowmeter, an electromagnetic field is generated whose lines of flux are mutually perpendicular to the longitudinal axis of the flow tube through which the fluid to be metered is conducted and to the transverse axis along which the electrodes are located at diametrically-opposed positions with respect to the tube. The operating principles are based on Faraday's law of induction which states that the voltage induced across any conductor as it moves at right angles through a magnetic field will be proportional to the velocity of that conductor. Because the metered fluid effectively constitutes a series of fluid conductors moving through the magnetic field; the more rapid the rate of flow, the greater the instantaneous value of the voltage established at the electrodes.

The typical commercially-available magnetic flowmeter is provided with mounting flanges at either end thereof. The meter is interposed between the upstream and downstream pipes of a fluid line, each pipe having an end flange. The mounting flanges on the meter are bolted to the flanges of line pipes. It is, of course, essential that the circle of bolt holes on the mounting flanges of the meter match those on the pipe flanges.

In a magnetic flowmeter, the flow tube is subjected to the same fluid pressure as the line pipes. The flow tube must therefore be of a material and of a thickness sufficient to withstand this pressure, even though the strength of the flow tube is unrelated to its measuring function. This design factor contributes significantly to the cost of a standard meter. Existing meters are made up of components that must be assembled, and are generally of substantial size and weight and quite expensive to manufacture.

In order to provide a compact and readily installable electromagnetic flowmeter whose weight and dimensions are substantially smaller than existing types, the above-identified related patent applications and patents disclose highly compact flangeless flowmeters which, despite their reduced volume and weight, are capable of withstanding high fluid pressures, the flowmeters operating efficiently and reliably to accurately measure flow rates.

The main concern of the present invention is with the problem of galvanic and slurry noises which are exhibited by meters having electrodes in contact with the fluid being metered; another concern is the measurement of fluids whose conductivity is so low that it approaches that of a dielectric.

In the Appel U.S. Pat. No. 4,019,386 and in my prior patent 4,098,118, instead of small area measuring electrodes in direct contact with the fluid being metered, use is made of electrode assemblies encapsulated in insulation material. Each assembly is formed by a measuring electrode having a large area behind which is a driven shielding electrode of even greater area, the measuring electrodes being isolated from the fluid by a layer of insulation. Each measuring electrode forms one plate of a capacitor whose dielectric is the insulation layer and whose other plate is the fluid, the electrodes acting as a capacitance sensor to detect the voltage induced in the fluid.

A capacitance electrode sensor of this type obviates slurry and galvanic noise problems and is not subject to leakage. Also among the advantages of a capacitance sensor over contact electrodes in a magnetic flowmeter are that the conductivity range of the fluid to be metered may extend down to as low as 0.1 $\mu$S/cm or less, and one may use ordinary metals for the electrodes rather than special materials capable of withstanding the adverse effects of corrosive or abrasive fluids in contact with the electrodes.

In constructing a flowmeter of the type disclosed in the Appel et al. patent, an electrode assembly package constituted by a curved measuring electrode plate and a curved shielding electrode plate is placed against the curved inner surface of the flow tube. Then a non-conductive plastic potting compound is cast into the flow tube to encapsulate the electrode assembly package and at the same time to define a uniform flow passage through which the fluid is conveyed to intercept a magnetic field and thereby induce a signal in the capacitance measuring elec- trodes.

With a unitized electrode assembly of the Appel et al. type, it often becomes difficult to match the curvature of the assembly to the curvature of the tube to a degree necessary to eliminate air spaces in the final encapsulation and thereby minimize the possibility of electrode motion. Such electrode displacement gives rise to noise in the meter output signal and has other adverse effects. Also a unitized electrode package, when its thickness is significant as is often the case, introduces widely differing section thickness in the final encapsulant, which in turn causes uneven shrinkage during the curing process and undesirable internal stresses in the potting compound.

SUMMARY OF INVENTION

In view of the foregoing, the main object of this invention is to provide in a magnetic flowmeter, capacitance electrode assemblies embedded within an insulating layer molded against the inner wall of a non-magnetic spool through which the fluid to be metered is conducted, whereby displacement of the electrodes is prevented.

More particularly, an object of this invention is to provide a technique for molding a tubular insulating layer against the inner wall of a non-magnetic spool to define a flow conduit for the fluid to be metered and to encapsulate a pair of electrode assemblies at diametrically-opposed positions with respect to the spool.

A significant feature of the invention resides in a tubular inner liner of dielectric material which covers the insulating layer in which the electrode assemblies are embedded and which isolates these assemblies from the fluid passing through the liner, the liner material being compatible with the fluid so that should the fluid be corrosive or abrasive in nature, the liner is unaffected thereby.

Briefly stated, these objects are attained in an electromagnetic flowmeter for metering the flow rates of fluids of low conductivity, the flowmeter including a non-magnetic spool within which is disposed a pair of electrode assemblies at diametrically-opposed positions embedded within an insulating layer molded against the inner surface of the spool. Each assembly is constituted by a curved measuring electrode plate and a curved shielding electrode plate concentric with the spool, the face of the measuring electrode plate being exposed. Received within the insulating layer and covering the faces of the measuring electrode plates is a tubular liner made of dielectric material whose properties are appropriate to the fluid being metered, the liner defining a flow conduit for the fluid. In operation, each measuring electrode forms one plate of a capacitor whose dielectric is the liner and whose other plate is the fluid being metered, the electrodes acting as a capacitance-sensor to detect the voltage induced in the fluid when it intercepts a magnetic field whose lines of flux are normal to the flow direction.

OUTLINE OF DRAWINGS

For a better understanding of the invention as well as other objects and further features thereof, reference is made to the following detailed description to be read in conjunction with the accompanying drawings, wherein:

FIG. 1 is a longitudinal mid-section taken through a flangeless magnetic flowmeter which incorporates therein an encapsulated capacitance electrode assembly in accordance with the invention;

FIG. 6 illustrates the spool, in perspective, with the molded insulation liner cut away to expose the plates of the electrode assembly.

DESCRIPTION OF INVENTION

Structure of Meter

Figure 2:
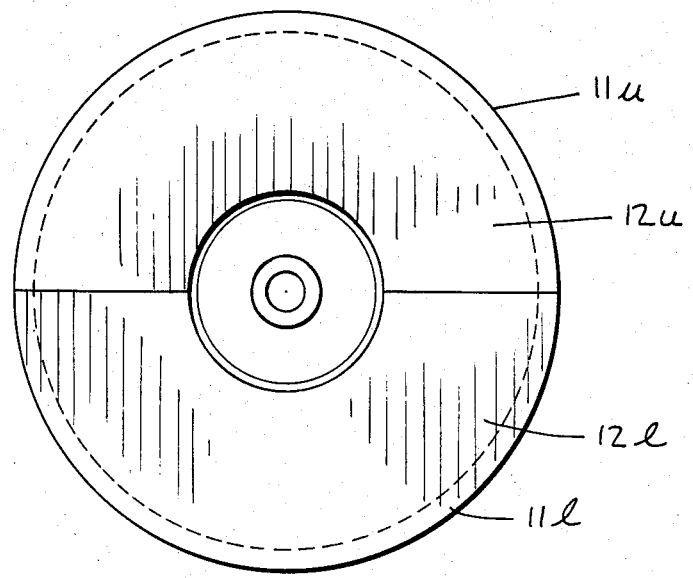
FIG. 2 is an end view of the flowmeter.

Referring now to FIGS. 1 and 2, there is shown a flangeless electromagnetic flowmeter which is generally in the structural form disclosed in my related U.S. Pat. No. 4,253,340, except that in this prior patent, the electrodes are of the contact type, whereas in the meter in accordance with the invention, capacitance type electrode assemblies are provided for measuring the flow rate of fluids.

The flowmeter includes a non-magnetic spool 10 of high strength material capable of withstanding prevailing fluid pressures, preferably fabricated of stainless steel, the spool having end flanges 10A and 10B. Concentric with spool 10 is a split casing formed by complementary half pieces $11\mu$ and 11L whose longitudinal edges are welded or otherwise joined together. The opposite sides of the casing are provided with arched closure plates $12\mu$–$13\mu$ and $12\lambda$ and $11\lambda$ and whose inner peripheries mate with the outer peripheries of end flanges 10A and 10B of the spool to define an inner chamber in the space between the spool and casing.

The split casing is formed of cast steel or other "soft" ferromagnetic material. Integral with the casing pieces are two magnet cores (not shown) formed of the same material. The cores are placed at diametrically-opposed positions along a Y axis which is at right angles to the flow axis X of the meter. Surrounding the magnet cores are coils to form electromagnets for producing an electromagnetic field whose lines of flux are parallel to the magnet axis Y and normal to the flow axis X. Thus the split casing functions not only as the housing for the meter but also affords the magnetic flux return path for the electromagnets. These electromagnets, which may be of the type disclosed in my related U.S. Pat. No. 4,253,340, are not illustrated in the present case whose primary concern is the capacitance electrode assembly and the manner in which it is encapsulated.

Disposed within spool 10 at diametrically-opposed positions along an electrode axis Z which is perpendicular both to the magnet axis Y and the flow axis X is a pair of electrode assemblies $A_1$ and $A_2$. Each assembly includes a curved measuring electrode plate 14 of large area behind which is a curved driven shielding electrode plate 15 of larger area, the two plates conforming to the curvature of the spool.

Electrode assemblies $A_1$ and $A_2$ are embedded in a tubular layer 16 of insulating material molded against the inner surface of spool 10, the faces of the measuring electrodes 14 being exposed. Connections to the electrodes are made by a short coaxial line extending through a center bore in spool 10, the inner conductor 17 of the line forming the lead for measuring electrode 14 and the tubular outer neck 18 forming the lead for shielding electrode 15.

Received within insulating layer 16 is a liner 19 of dielectric material which covers the exposed faces of the measuring electrodes 14. The liner is provided with end flanges 19A and 19B which overlies the end flanges 10A and 10B of the spool.

The liner defines the flow conduit of the meter; and when the fluid to be metered flows in the direction of flow axis X and intersects the lines of magnetic flux which run parallel to magnet axis Y, a voltage is induced therein. This voltage is sensed by the capacitance electrode assemblies which make no direct contact with the fluid.

The flangeless meter is interposed between the mounting flanges of the upstream and downstream pipes carrying the fluid to be metered so that the flow conduit in the meter lies in registration with these pipes. The flangeless meter is compressed between the pipe mounting flanges by a circle of bolts which bridge the flanges in the manner illustrated in my related U.S. Pat. No. 4,253,340.

Method of Assembly

Figure 3:
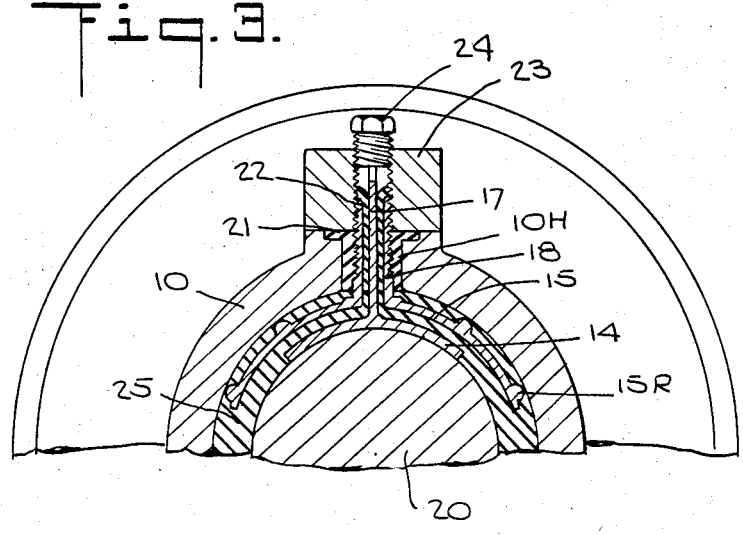
Fig. 3 is a sectional view taken through a mold for encapsulating the electrode assemblies, the figure illustrating the first step in the molding procedure.

Referring now to FIG. 3, there is shown the core 20 of a potting fixture for molding the tubular insulating layer 16 which encapsulates the electrode assembly formed by measuring electrode plate 14 and shielding electrode plate 15. Core 20 of the fixture has a diameter that substantially matches the inner diameter of spool 10 which is supported on the fixture core during the casting procedure.

Added to the curved outer surface of shielding electrode plate 15 is a parallel array of insulating ribs 15R formed of an epoxy insulating material. These ribs act as spacers when the shield is assembled into spool 10 so that the potting material flows behind as well as in front of the shielding electrode, and the shielding electrode is thereby electrically isolated from the metal spool. In practice, both the shielding and measuring electrodes may be provided with perforations to enhance the integrity of the final encapsulation.

The short coaxial line formed by inner lead 17 connected to measuring electrode 14 and neck 18 connected to shielding electrode 15 protrudes through a radial bore 10H in spool 10. Neck 18 is externally threaded and received thereon within spool bore 10H is an internally-threaded bushing 21 which acts to position shielding electrode plate 15 securely against the inside contour of spool 10. A second bushing 22 of smaller diameter is inserted into the annular space between inner lead 17 and neck 18 to maintain the proper concentricity therebetween.

Also threadably received on neck 18 above the first bushing 20 is a tooling cap 23 having a threaded bore therein which threadably receives a plug 24 having a pin which engages lead 17 of the measuring electrode 14. This plug is turned in to force measuring electrode 14 radially inward against core 20 so that now all parts are rigidly supported within the potting fixture.

The annular space between core 20 and spool 10 defines a molding cavity 25 for forming the insulating layer 16 for encapsulating the electrode assembly.

The next step in the procedure is to fill cavity 25 with a curable, castable plastic encapsulant. This may be an epoxy, a polyurethane rubber or other castable resin having good electrical insulating properties. Normal casing techniques are used to cause the encapsulant to flow axially with respect to spool 10 but not over the faces of the flanges 10A and 10B of the spool to thereby fully occupy cavity 25 and create the insulating layer 16.

Figure 4:
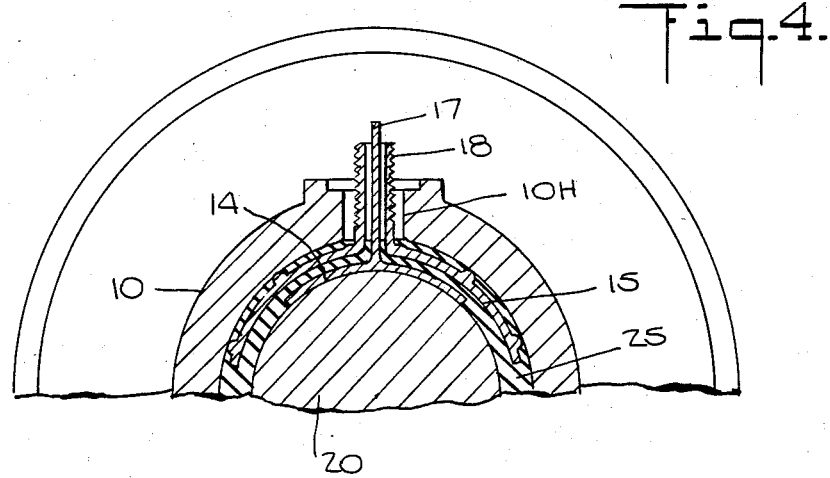
FIG. 4 illustrates the second step in the procedure.
Figure 5:
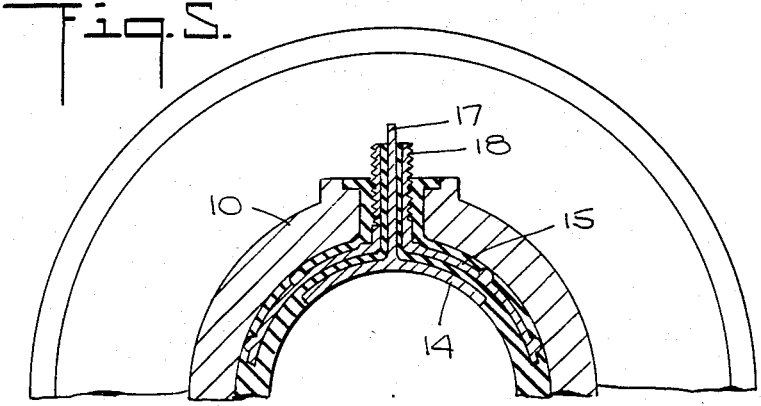
FIG. 5 illustrates the third step.

When the encapsulant has fully cured, tooling cap 24 is removed as well as bushings 21 and 22, thereby exposing the space between the inner lead 17 and neck 18 of the coaxial line as well as the space between neck 18 and the wall of spool bore 10H, as shown in FIG. 4. The spaces vacated by the bushings are then filled with the potting compound, as shown in FIG. 5, which is poured into these spaces.

The spool having the electrode assemblies embedded in the tubular insulation layer 16, as shown in FIG. 6, is removed from the potting fixture. At this point, the faces of the measuring electrodes 14 are exposed. Finally, the insulating liner 19 is cast within the tubular insulating layer 10 to cover the measuring electrodes, the end flanges 19A and 19B of the liner overlying the end flanges 10A and 10B of the spool.

The liner material may be the same as the encapsulant or it may be of another material that will adhere to all surfaces to be lined. The liner material which defines the flow conduit and is exposed to the fluid being metered is selected for its mechanical, electrical and chemical properties to best suit the intended uses of the flowmeter. If, for example, the fluid to be metered is highly corrosive, a suitable fluorocarbon material, such as PTFE, may be used which is non-reactive with the fluid. In the case of fluids conveying abrasive particles, the selected liner material must be abrasion-resistant.

In some instances, it may be desirable to mount pre-amplifiers directly over the electrode assemblies to avoid extended lines from the electrode assemblies to the pre-amplifiers that may pick up stray or parasitic signals.

Figure 7:
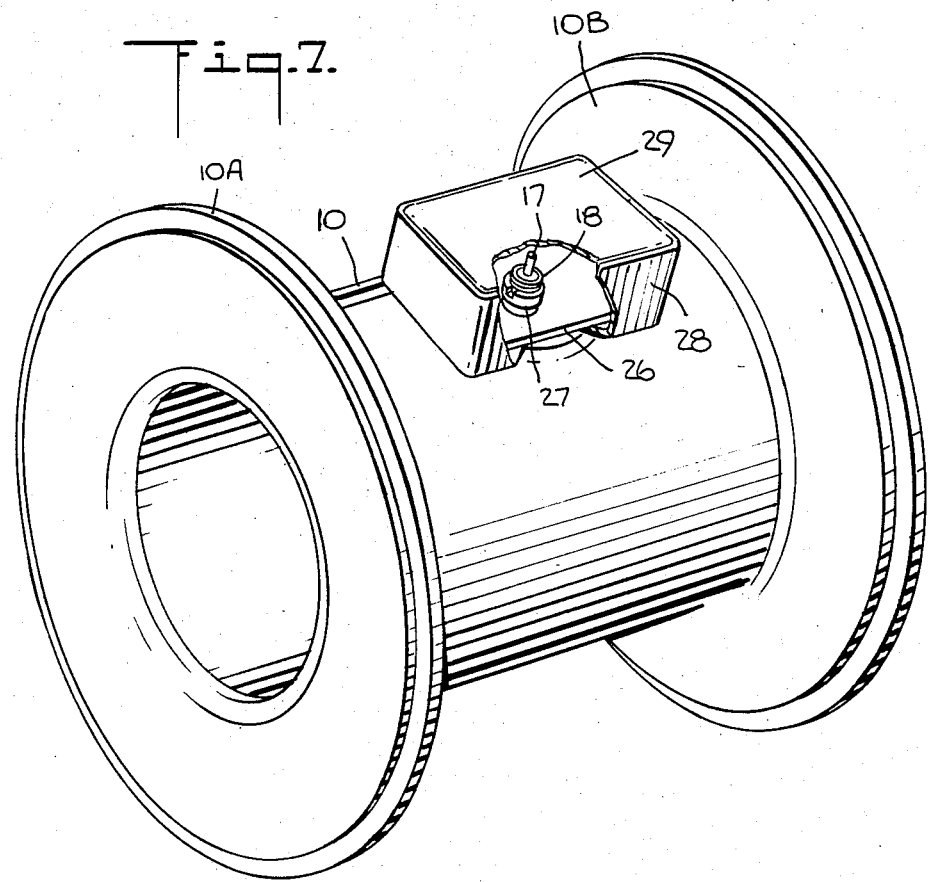
FIG. 7 shows the completed spool and a box for housing pre-amplifiers associated therewith.

To this end, a circuit board 26 containing the components of the pre-amplifier, as shown in FIG. 7, is provided with a bore through which is projected the neck 18 and leads 17 of the short coaxial line protruding through the bore of spool 10. Circuit board 26 is mounted at the base of a metal case 28, and the board is held in place on the spool by a nut 27 received on neck 18. After completion of the internal wiring to connect the coaxial line to the pre-amplifiers on the board, a metal cover 29 is soldered on the top of case 28 to form a hermetic seal.

This pre-amplifier box is housed within the annular cavity 30, as shown in FIG. 1, formed between spool 10 and split casing 11μ, 11λ. Also in this cavity are the electromagnets (not shown) for the meter. This cavity can be filled with a suitable potting compound, so that all components of the meter which are within the spool and are external thereto are encapsulated to provide a highly stable monolithic structure.

Because in the flowmeter structure it is dielectric material that makes contact with the measuring electrodes, the shielding electrodes and the body of the spool, as well as with the fluid being metered, the capacitances between these elements will have identical dielectric constants and temperature characteristics.

While there has been shown and described a preferred embodiment of CAPACITANCE-TYPE ELECTRODE ASSEMBLIES FOR ELECTROMAGNETIC FLOWMETER in accordance with the invention, it will be appreciated that many changes and modifications may be made therein without, however, departing from the essential spirit thereof. Thus the invention is not limited to metal spools and is applicable to spools of ceramic and other non-magnetic material.

I claim:

1. An electromagnetic flowmeter for metering the flow rates of fluids, the flowmeter comprising:

A. a cylindrical non-magnetic spool;
   B. a pair of electrode assemblies disposed at diametrically-opposed positions within the spool, each assembly including a measuring electrode plate behind which is a shielding electrode plate, said plates being curved to conform concentrically to the curvature of the spool, said plates being encapsulated within a tubular insulating layer molded against the inner surface of the spool whereby the shielding electrode plate lies adjacent said surface, and the face of the measuring electrode plate is exposed, said shielding electrode plate being provided with insulating ribs which space it from the inner surface of the spool; and C. a tubular liner of dielectric material having properties appropriate to the fluid being metered, said liner being received within the insulating layer to cover the faces of the measuring electrode plates, whereby each measuring electrode forms one plate of a capacitor whose dielectric is the liner and whose other plate is the fluid passing therethrough.

2. A flowmeter as set forth in claim 1, wherein said spool is provided with end flanges.

3. A flowmeter as set forth in claim 2, further including a split casing of ferromagnetic material concentric with said spool, said casing having end closures which mate with the flanges of said spool to define an internal cavity.

4. A flowmeter as set forth in claim 2, wherein said liner is provided with end flanges that overlie the end flanges of the spool.

5. A flowmeter as set forth in claim 2, wherein said spool is made of stainless steel.

6. A flowmeter as set forth in claim 3, wherein said spool has a radial bore therein through which protrudes a short coaxial line having a neck that is connected to the shielding electrode plate and an inner lead connected to the measuring electrode plate.

7. A flowmeter as set forth in claim 6, further including a pre-amplifier disposed in said cavity and connected to said coaxial line.

8. A flowmeter as set forth in claim 1, wherein said insulating layer is formed of epoxy.

* * * * *